United States Patent
Ryan et al.

(10) Patent No.: US 12,374,227 B1
(45) Date of Patent: Jul. 29, 2025

(54) SMARTPHONE MARINE VESSEL LOCATION AND COLLISION AVOIDANCE SYSTEM

(71) Applicants: Robert Ryan, Mattapoisett, MA (US); Stephen Hayes, Franklin, MA (US); Robert E. Pantano, Franklin, MA (US)

(72) Inventors: Robert Ryan, Mattapoisett, MA (US); Stephen Hayes, Franklin, MA (US); Robert E. Pantano, Franklin, MA (US)

( * ) Notice: Subject to any disclaimer, the term of this patent is extended or adjusted under 35 U.S.C. 154(b) by 59 days.

(21) Appl. No.: 18/235,822

(22) Filed: Aug. 19, 2023

Related U.S. Application Data (63) Continuation-in-part of application No. 17/023,896, filed on Sep. 17, 2020, now Pat. No. 11,735,054.

(60) Provisional application No. 62/901,658, filed on Sep. 17, 2019.

(51) Int. Cl.
| | |
|---|---|
| *G08G 3/02* | (2006.01) |
| *B63B 49/00* | (2006.01) |
| *G01S 19/39* | (2010.01) |
| *G05D 1/00* | (2024.01) |

(52) U.S. Cl.
CPC ............... *G08G 3/02* (2013.01); *B63B 49/00* (2013.01); *G01S 19/393* (2019.08); *G05D 1/0206* (2013.01); *B63B 2213/02* (2013.01)

(58) Field of Classification Search
None
See application file for complete search history.

(56) References Cited

U.S. PATENT DOCUMENTS

| | | | |
|---|---|---|---|
| 4,313,115 A | 1/1982 | O'Sullivan | |
| 5,210,534 A | 5/1993 | Janex | |
| 5,381,338 A | 1/1995 | Wysocki et al. | |
| 5,696,403 A * | 12/1997 | Rostoker | H01L 23/5222 257/532 |
| 6,048,248 A | 4/2000 | Ritchey | |
| 6,373,447 B1 * | 4/2002 | Rostoker | G06K 19/07779 257/491 |
| 7,710,309 B2 * | 5/2010 | Kao | G01S 7/021 342/41 |
| 7,840,355 B2 | 11/2010 | Breed et al. | |
| 7,899,621 B2 | 3/2011 | Breed et al. | |
| 9,925,940 B1 * | 3/2018 | Christensen | B60R 21/0136 |
| 9,934,625 B1 * | 4/2018 | Wahba | G07C 5/008 |

(Continued)

FOREIGN PATENT DOCUMENTS

WO  WO-2016027048 A1 *  2/2016  ............. G08G 1/164

*Primary Examiner* — Fekadeselassie Girma
(74) *Attorney, Agent, or Firm* — Invention To Patent Services; Alex Hobson (57) ABSTRACT

A smartphone marine vessel location system utilizes global positioning to determine the location and trajectory of marine vessels. When two marine vessels have a trajectory that will bring the vessels within a warning zone a trajectory alert is activated and when the two vessels enter into a warning zone, a collision warning is activated. An App on the smartphones may produce a display showing the location of the marine vessels and may produce the alerts when required. The smartphone may also communicate with other navigational system on the marine vessel to produce a display and alerts, such as through Bluetooth. The location of marine vessels may be acquired through the App, through a crowd-sourcing application, and/or through a carrier sourced location.

19 Claims, 5 Drawing Sheets

(56) References Cited

U.S. PATENT DOCUMENTS

| | | |
|---|---|---|
| 10,019,006 B2 | 7/2018 | Shah et al. |
| 11,461,457 B2 * | 10/2022 | Dwarakanath ....... G06V 10/764 |
| 2005/0037730 A1 * | 2/2005 | Montague ............. B60R 25/102 |
| | | 455/456.1 |
| 2006/0038688 A1 * | 2/2006 | Nakamura ........... G06Q 10/063 |
| | | 340/522 |
| 2016/0125739 A1 | 5/2016 | Stewart et al. |
| 2017/0053461 A1 * | 2/2017 | Pal ......................... G08G 1/012 |
| 2020/0219336 A1 * | 7/2020 | Huffman .............. G08G 1/0129 |
| 2021/0295441 A1 * | 9/2021 | Mullen ................ G08G 1/0112 |
| 2022/0076037 A1 * | 3/2022 | Hochman .............. G05D 1/249 |
| 2022/0219682 A1 * | 7/2022 | Ollis ............... B60W 30/18109 |

* cited by examiner

SMARTPHONE MARINE VESSEL LOCATION AND COLLISION AVOIDANCE SYSTEM

CROSS REFERENCE TO RELATED APPLICATIONS

This application is a continuation in part of U.S. patent application Ser. No. 17/023,896, filed on Sep. 17, 2020 and currently pending, which claims the benefit of priority to U.S. provisional patent No. 62/901,658, filed on Sep. 17, 2019; the entirety of which is hereby incorporated by reference herein.

BACKGROUND OF THE INVENTION

Field of the Invention

The invention relates to a smartphone marine vessel location system that produces alerts or warning to prevent collision of marine vessels.

Background

Marine vessels, and especially recreational marine vessels rely on visual detection of other marine vessels to avoid collision. The waterways are becoming more and more congested making it difficult to navigate around all the other vessels. In addition, weather can change quickly on the water and dramatically reduce visibility which can make it difficult if not impossible to safely navigate to avoid other marine vessels.

SUMMARY OF THE INVENTION

The invention is directed to a smartphone marine vessel location system that can provide an alerts and warnings to avoid collision between marine vessels. An exemplary smartphone marine vessel location system utilizes the global positioning system (GPS) of a smartphone on a marine vessel to track the location and determine a trajectory of said marine vessel. The location of a marine vessel may be accurate within about 4.9 m (16 ft) radius under open sky using the GPS system of a smartphone. An exemplary smartphone marine vessel location system may include an App, or application software, that provides a display of the location of the marine vessel and other marine vessels. The App may also track and monitor direction and speed, or trajectory of movement of the vessels. The App may provide a trajectory alert when two vessels have a trajectory that will bring them within warning zone distance of each other, such as within about 500 ft, within about 300 ft, within about 200 ft, within about 100 ft, within about 50 ft and any range between and including the distances provided. An initial trajectory alert may be provided when the vessels have a trajectory to bring them within a warning zone distance and a collision warning may be provided when the vessels move within a warning zone distance. The app may automatically track the location of a marine vessel when the smartphone owner boards a marine vessel, as determined by GPS and speed. When a person boards an aircraft, the speed of the aircraft may be above an upper threshold speed for marine craft and therefore their location may not be included in the system monitoring. When a user downloads the App, they may have to provide authorization for the App to monitor their location using the GPS function of the smartphone, regardless of the App being open by the user.

An exemplary smartphone marine vessel location system may utilize cellular communication between smart phones to enable tracking, monitoring and warning of collisions. Cellular communication may include the use of cellular towers and/or satellite communication and signal transmission.

An exemplary smartphone marine vessel location system utilizes smartphones on the marine vessels to track the location of the marine vessels. Smartphones on the marine vessels utilize GPS to provide updated location information to the smartphone marine vessel location system. Smartphones on the marine vessels receive location information from the smartphone marine vessel location system through GPS or GLONASS. Note that smartphone to smartphone communication may be through cellular service. An exemplary smartphone marine vessel location system may include a display showing the location of the marine vessel and the location of nearby marine vessels. An exemplary smartphone marine vessel location system may provide a trajectory alert or collision warning when the location and direction of travel of two or more marine vessels may result in a collision of the marine vessels. An exemplary smartphone marine vessel location system may interface with chartplotters or other onboard navigational systems to provide location information of the marine vessel and other marine vessels in the arear. The smartphone may communicate with the onboard navigational systems through conventional means, wired connection, or wireless communication, such as Bluetooth communication, through an onboard server and the like. The onboard navigational systems may require the user to synch their smartphone with the onboard navigational systems.

The location of the user's marine vessel and other marine vessels may be determined through the GPS on each of the phones and through the App. In some cases, location and tracking by the system may require that all vessels have a user registered with the App. However, smartphone locations may be monitored by the wireless service provider and the smartphone marine vessel location system may utilize this information without requiring each person to have the App downloaded on their smartphone. Locations of marine vessels may be determined through Crowdsourced information and/or by carrier sources location information. The location of a marine vessel may be determined if anyone on the marine vessel has a smartphone and has enable GPS location.

Today cellular services reach well into coastal waters which is where most of the recreational marine traffic and marine congestion exist. Marine services can be created using location information attained over the cellular network from smartphones on vessels. Position, direction and speed of marine vessels can be determined from this information. Over time cellular services reach will extend even further into lakes, seas and oceans. It is not unreasonable to expect to have total global cellular coverage in the future. Location information can be captured via a Crowdsourced application or directly from cellular carriers.

The marine vessel location system and collision avoidance system may identify the number of smartphones that are within a proximity distance to each other and moving in the same trajectory as being on a single marine vessel. The marine vessel location system and collision avoidance system may then use the number of smartphones identified on a vessel for the display icon shape or size or color. In an exemplary embodiment, the icon size is increased when the number of smartphones identified as being on a single vessel is above a threshold number, such as more than two, more than five, more than 10, more than 100 and the like. A cruise ship may have hundreds of identified smartphones onboard, a sail boat or motor boat may only have 10 or less identified smartphones onboard, a personal watercraft, such as a kayak or small sailboat may have one or two smartphones identified thereon. The marine vessel location system and collision avoidance system may have a small, medium and large icon to identify relative size of the marine vessels on the display.

Applications

Crowdsourced Application: A custom application can be developed that runs on smartphones and shares real-time information with other smartphones running the application. Information such as type, size, name and location of vessel can be shared. The direction of travel and speed of the vessel can be calculated using this data collected over time. This data can be use in a number of ways as an aid to marine navigation, marine congestion management, collision warning, detection and rescue. The data collected with this application can be communicated to Chartplotters using industry standard digital interfaces for navigation equipment. Chartplotters can overlay this data on top of navigation charts showing the vessel name, position, direction and speed of all vessels in the area.

Carrier Sourced Location Information Application: A custom application can be developed in collaboration with cellular carriers to share location information of all smartphones. The application can determine if the smartphones are on water and if so will assume that it is on a vessel and will capture its location information. The direction of travel and speed of the vessel can be calculated using this location information collected over time. This data can be use in a number of ways as an aid to marine navigation, marine congestion management, collision warning, detection and rescue. The data collected with this application may be communicated to Chartplotters using industry standard digital interfaces for navigation equipment. Chartplotters will overlay this data on top of navigation charts showing the position, direction and speed of all vessels in the area.

Marine authorities, such as the Coastguard and other marine safety and rescue authorities may have authorized access to the system and may be alerted by a collision detection algorithm when a collision is detected. A collision detection algorithm may determine a collision when two or more marine vessels have a trajectory that brings them within a collision proximity distance of each other. This collision proximity distance may be about 6.1 m (20 ft) or less, about 3 m (10 ft) or less, about 2 m (6.5 ft) or less and any range between and including these values.

The collision detection algorithm may also monitor speed of marine vessels and the speed in combination with the collision proximity distance may be required to initiate a collision notification to the marine authorities. The speed of the one or more of the marine vessels when the trajectory is within a collision proximity distance may have to be above collision threshold speed of 8.7 knots (10 mph) or more, about 10 knot or more, about 15 knot of more, about 17.4 knot (20 mph) or more, about 26 knots (30 mph) or more, and any range between and including the collision threshold speeds detected. Furthermore, the collision detection algorithm may detect a sudden deceleration of a marine vessel that has come within a collision proximity distance of another marine vessel or with a fixed objection, such as a landmass, pier, dock and the like. The collision detection algorithm may provide a notification to the marine authorities when a threshold collision deceleration rate has been detected such as more than 50 G force deceleration or more, about 100 G force or more and any range between and including the values provided. Note that the collision detection algorithm may also monitor a suspected collision event for movement of the vessel or vessels after a suspected collision. If the vessel or vessel continue moving past or through a suspected collision event, then it may be determined that no collision has occurred and the authorities may not be alerted. The authorities may place a call to a mobile device, such as a mobile phone of a vessel that is determined to be in a collision. Alternatively, a system application may provide an emergency alert to a mobile device on a vessel determined to have been in a collision and require confirmation of a collision, or that no collision has occurred.

The marine vessel location system and collision avoidance system may require a user to input a marine vessel type and the collision threshold speed may be a function of the type of marine vessel, wherein a sailboat may have a lower collision threshold speed than a motor boat. Also, the collision threshold speed may be different for a trajectory that intersects with a fixed object, pier or dock, than a trajectory that intersects with another marine vessel.

A crowdSharring application (APP) can be downloaded onto a mobile device, such as a smartphone, and the crowdsharring APP, may log the GPS location and upload it along with User Data to a Host System via a cellular network. The same APP may track smartphone locations and the user data from the host system that are part of the crowdSharing group. Location, direction and speed can be determined for each smartphone subscribed to the APP. A set of analytics running on the smartphone can warn users of potential hazards as described herein. The smartphone may emit an audible alarm, and/or vibrate when there is potential collision event, wherein there is a trajectory that may result in a collision with a land mass, a structure such as a dock, or pier, or with another marine vessel. The smartphone can interface to equipment on the vessel such as chartplotters and autopilots via standard communication interfaces.

User data can consist of the following: user name, vessel name, vessel details (i.e. power or sail, length) emergency contact information, trip plans, number of people on the boat and the like.

The host system includes a database for receiving and storing the smartphone locations with time stamps and user data and an interface to communicate to crowdsharring APP running on smartphones via the cellular network.

Carrier Sources

Cellular services providers (i.e. AT&T, Verizon, T-Mobile, . . . ) are capable of monitoring Smartphone locations at all times. This location information can be used to determine if a Smartphone is on a body of water. This information can be loaded into a Database and use by the cellular carrier or a third party (i.e. government agency like the Coast Guard) to determine location, direction and speed of each Smartphone. An application software or APP, may be loaded onto mobile devices (smartphones) and may monitor locations of these smartphones on a body of water. The same set of analytics can be developed and the application running on the Smartphone can interface to the same set of equipment on vessels.

Note that marine authority and other authorities may have automatic access to GPS locations of smartphones, or other mobile devices on a body of water. These authorities may have a system for monitoring when a potential collision event has occurred and they may send an emergency response team to the collision location for inspection, or they may request confirmation of no collision by contacting one or more of the owners of the marine device, which may be via a call to a smartphone having the APP as described herein. A marine authority as used herein may include the Coast Guard and other policy and law enforcement charged with monitoring a body of water.

This information is particularly useful for the vessel's navigator in planning and following a route. It will be extremely useful in poor weather conditions where visibility is limited and complimentary to radar and/or Automatic Identification System (AIS) systems. AIS is a tracking system that uses transponders on vessels. These transponders are extremely expensive and are rarely used in recreational vessels. AIS is mostly used in commercial shipping. Using smartphone location services as described above is a much more cost-effective system that can used by recreational boaters as well a commercial shipping.

A collision warning system can be built using the collected location information data of other ships to automatically notify a vessel's operator of a nearby vessel. This warning system will be extremely useful in poor weather conditions where visibility is poor.

https://www.gps.gov/systems/gps/performance/accuracy/

GPS-enabled smartphones are typically accurate to within a 4.9 m (16 ft.) radius under open sky.

The government provides the PGS signal in space with a global average user range error (URRE) of ≤0.006 m/sec over any 3-second interval, with 95% probability.

https://www.gps.gov/applications/roads/

GPS enables automatic vehicle location and in-vehicle navigation systems that are widely used throughout the world today. By combining GPS position technology with systems that can display geographic information or with systems that can automatically transmit data to display screens or computers, a new dimension in surface transportation is realized.

Location Information is found using Global Navigation Satellite Systems such as GPS and GLONASS.

Crowdsourced information is the practice of obtaining information (data) by enlisting the services of a large number of people, either paid or unpaid, typically via the Internet.

Definitions

A marine vessel, as used herein, is any watercraft including but not limited to, a ship, a barge, a recreational boat including a motor boat, sailboat, jet-ski, kayak, canoe and the like.

A smartphone, as used herein is a personal electronic device that has cellular service and cellular interfacing and is used for communication with others smartphones through phone calls, and also has GPS. A smartphone may be portable in size such as mobile telephone or tablet computer. A smartphone may be a mobile telephone that has a size, length, width, or thickness, of no more than about 250 mm or no more than 200 mm. A mobile telephone may have a phone number associated with it for receiving phone calls.

A Chartplotter is a device used in marine navigation that integrates Global Navigation Satellite System (GPS and GLONASS) location data with Electronic Navigational Charts (ENC) to show the position of a ship on a chart.

The International Electrotechnical Commission (IEC) has created a new standards suite for "Digital interfaces for navigational equipment within a ship". This is known as IEC 61162 and included NMEA 0183, NMEA 2000 and LWE.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
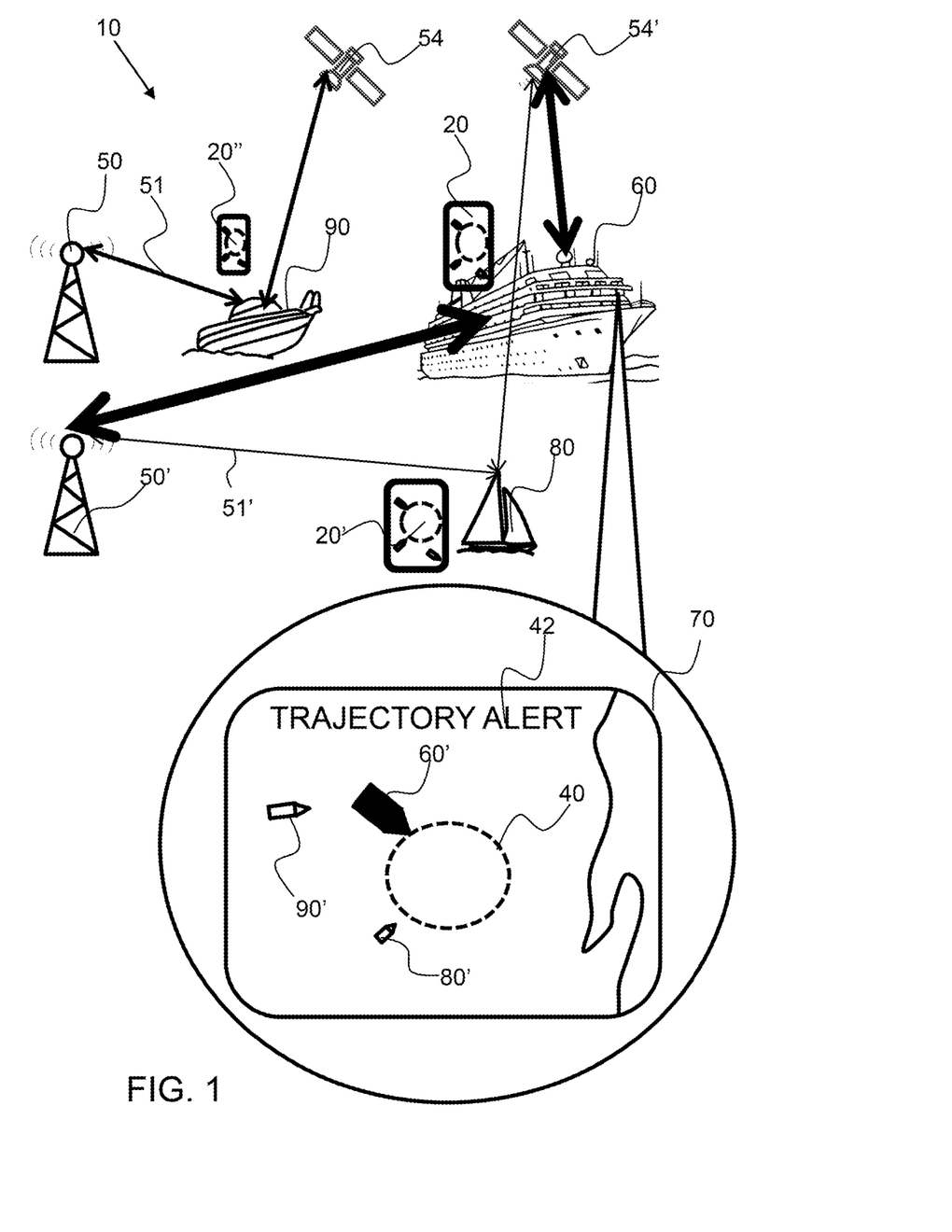
FIG. 1 shows a diagram of an exemplary smartphone marine vessel location and collision avoidance system.

As shown in FIG. 1, the exemplary smartphone marine vessel location system and collision avoidance system 10 utilizes smartphones, 20, 20' and 20" on the marine vessels 60, 80, and 90, respectively, to track the location and trajectory of the marine vessels. Smartphones on the marine vessels utilize GPS to provide updated location information to the smartphone marine vessel location system. Smartphones on the marine vessels receive location information from the smartphone marine vessel location system through GPS or GLONASS. Note that smartphone to smartphone communication may be through cellular service. An exemplary smartphone marine vessel location system may include a display showing the location of the marine vessel and the location of nearby marine vessels. As shown, the largest marine vessel 60, a cruise ship, has a chartplotter 70 that receives information from a smartphone on board, such as the Captain's or a dedicated smartphone for this purpose. The chartplotter shows the location of the first marine vessel 60 as well as the second marine vessel 80 and a third marine vessel 90. The third marine vessel 90 is moving behind the first marine vessel and therefore is not a potential collision hazard. The second marine vessel however, a small sailboat has a trajectory into the warning zone 40, and therefore a trajectory alert 42 is initiated. The chartplotter display shows the size of the marine vessels as a function of the number of smartphones identified as being onboard. The large cruise ship may have more than 10 smartphones identified by the system as being onboard and therefore is shown as a larger icon on the display. The recreational motor boat is shown as a medium sized icon as it may have less than 10 identified smartphones onboard and the small sailboat may be the smallest icon as it has two or less identified smartphones onboard. The communication signals shown have a weight to indicate the number of identified smartphones onboard as well. As shown, the smartphones may communicate with cell towers 50, 50' or through satellites 54, 54'. Also note that smartphones with different carriers may provide input to the system, wherein the smartphone 20" on the third marine vessel 90 communicates through a wireless signal 51 with the first cell tower and the smartphone 20' on the second marine vessel 80 communicates through a wireless signal 51' a second cell tower 50'. The App may receive input from a plurality of cell towers and/or satellites. The App may function through a database and receive all the location information and send out communications to the smartphones with the App installed.

The smartphone may have a chartplotter program, such as an App or other program for producing navigational displays and the smartphone marine vessel location system and collision avoidance system may interface with this chartplotter program to display the vessels on this chartplotter display. The two programs or Apps may be integrated to show navigational aids and also vessels on a single display on the smartphone. A navigational display may include waterway locations, land masses, navigational aids, water depths which may be used to determine routes.

Figure 2:
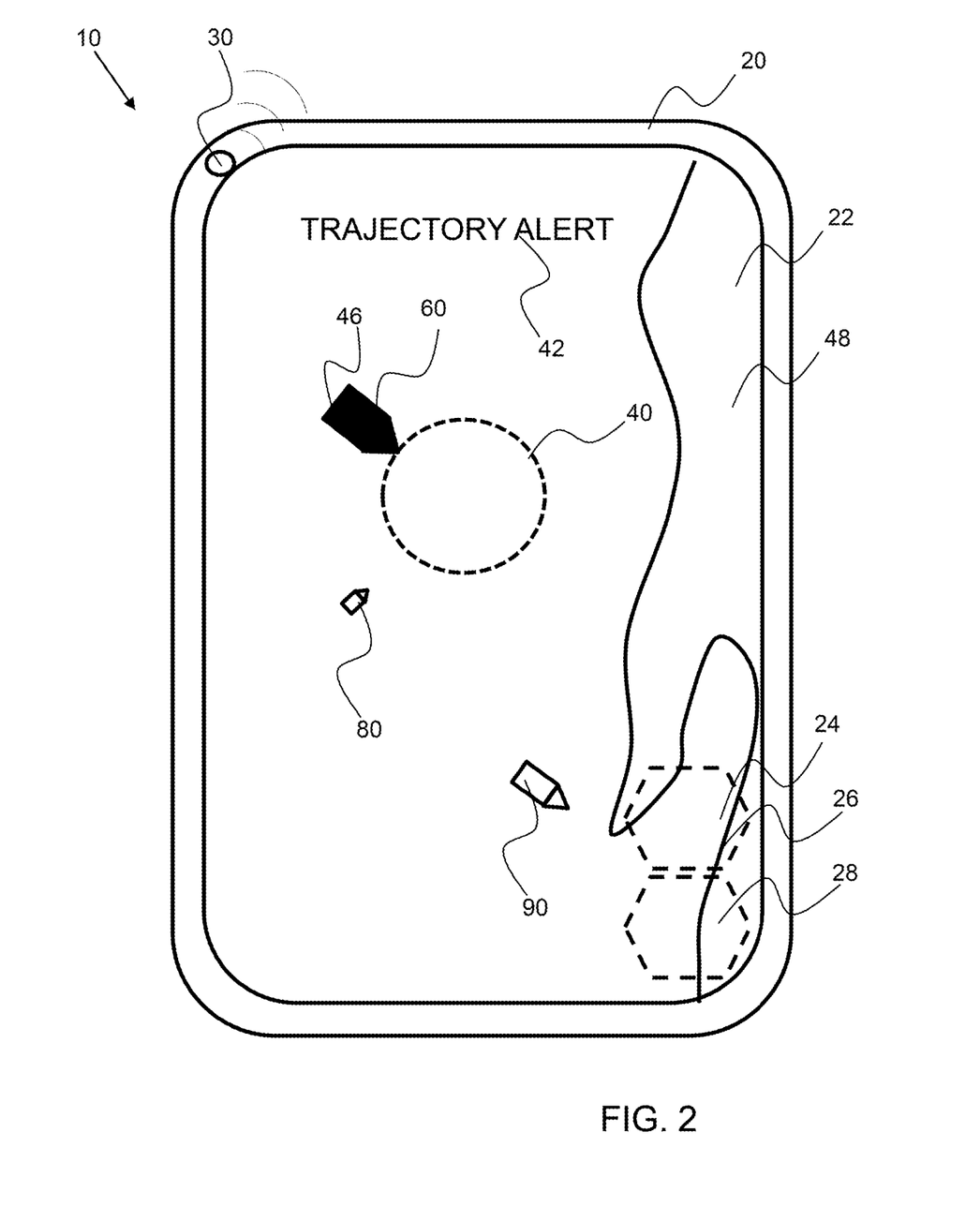
FIG. 2 shows an exemplary display on a smartphone having the location display showing the location of the user's or first marine vessel and the location of a second marine vessel, and a trajectory alert.
Figure 3:
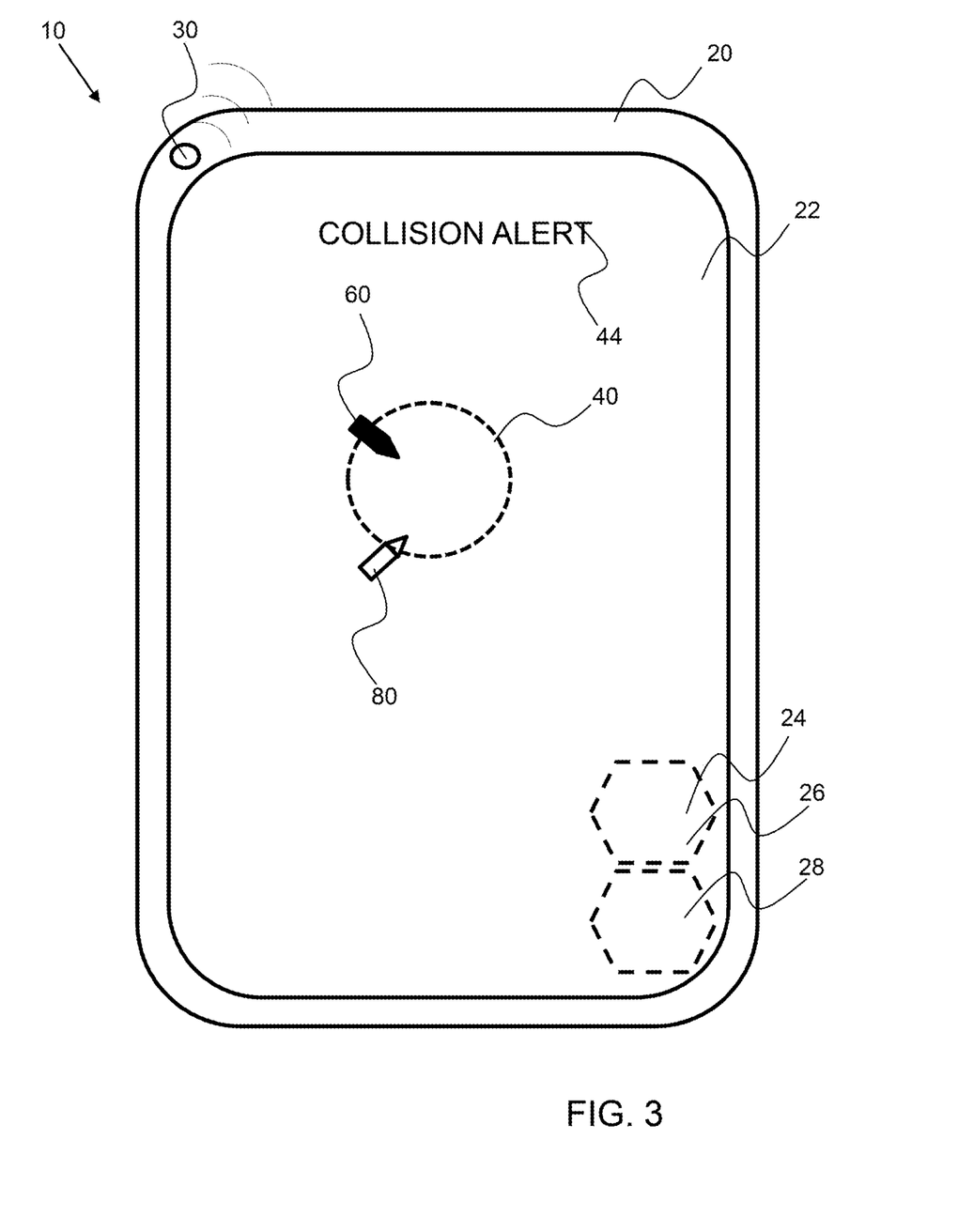
FIG. 3 shows an exemplary display on a smartphone having the location of the user's marine vessel and the location of a second marine vessel, and a collision warning.

Referring now to FIGS. 2 and 3, a smartphone marine vessel location system 10 produces a display 22, such as on a smartphone 20 that has the location of the user's marine vessel, or a first marine vessel 60 and the location of a second marine vessel 80 and third marine vessel 90. The display may show marine vessel icons 46 for the user's marine vessel and icons for the other marine vessels as well as land mass icons 48. The icons may be different colors, size or design to allow the user to quickly identify their marine vessel from other marine vessels. As shown the user's icon is black and the other marine vessels are white. The warning zone 40 is also displayed on the display. As shown in FIG. 2, the trajectory of the user's marine vessel and the trajectory of the second marine vessel will bring the two vessels within the warning zone 40. Therefore, a trajectory alert 42 has been activated, such as a display, or a sound emitted by the speaker 30. As shown in FIG. 3, the user's vessel 60 and the second marine vessel 80 have entered into a warning zone 40 and a collision warning 44 has been activated. The smartphone has a marine vessel location system and collision avoidance system App 26, a processor 28 and a GPS 24 to enable the function of the system. A smartphone has a wireless signal transceiver for communication with cellular devices, such as towers, or wi-fi from a server, such as in the home, Bluetooth, or satellites.

Figure 4:
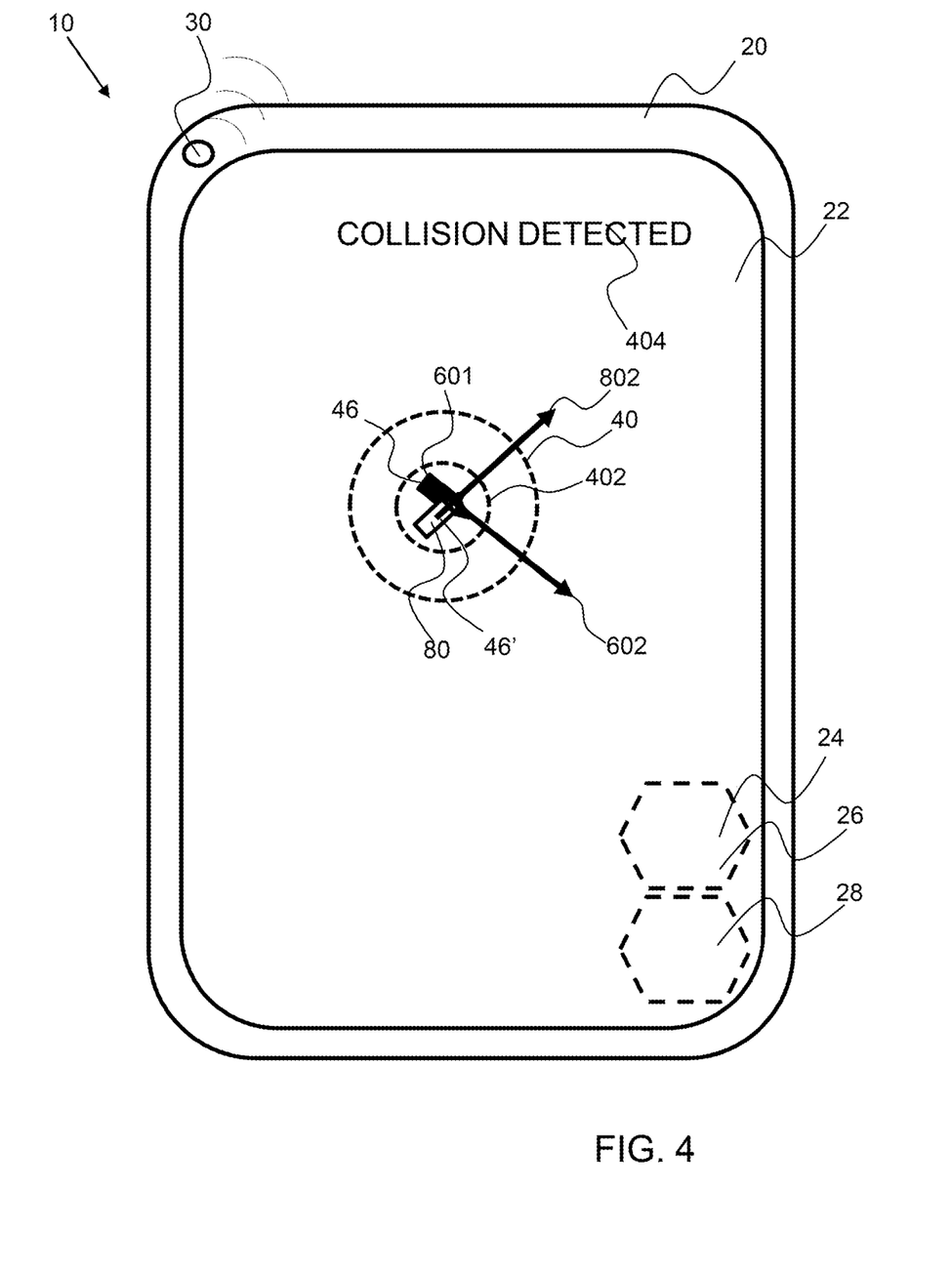
FIG. 4 shows a smartphone marine vessel location system that produces a display that has the locations of marine vessels, such as a first marine vessel and the location of a second marine vessel.
Figure 5:
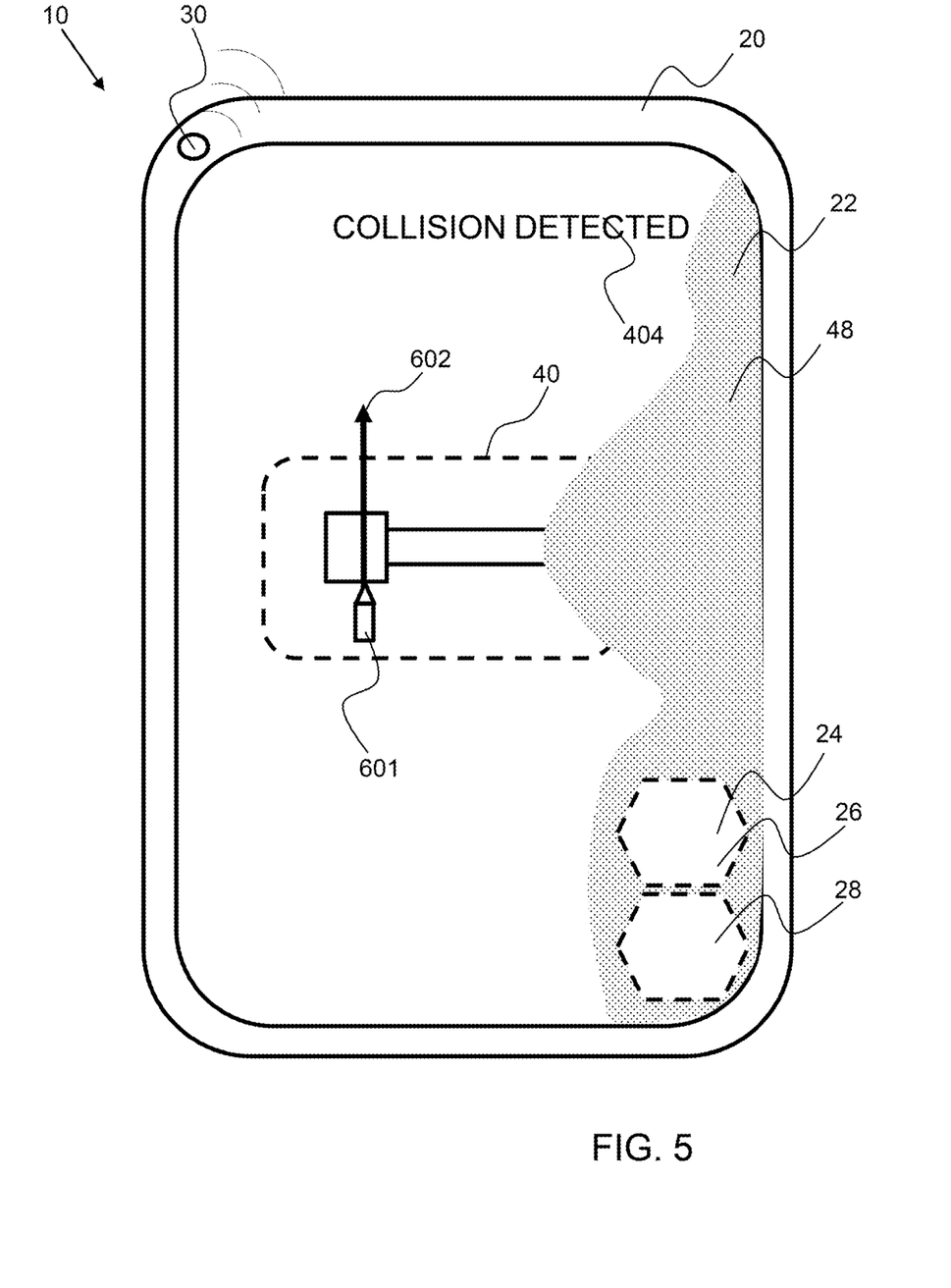
FIG. 5 shows a smartphone marine vessel location system that produces a display that has the locations of a first marine vessel.

Referring now to FIGS. 4 and 5, a smartphone marine vessel location system 10 produces a display 22, such as on a smartphone 20, or on a display in an authority location, that has the locations of marine vessels, such as a first marine vessel 601 and the location of a second marine vessel 80. The display may show marine vessel icons 46, 46' for the marine vessels and as well as land mass icons 48. The icons may be different colors, size or design to allow the user to quickly identify their marine vessel from other marine vessels. As shown a first marine vessel has a black icon and the other marine vessel has a white icon. A shown in FIG. 4, a collision has been detected. The trajectory 602 of the first marine vessel and the trajectory 802 of the second marine vessel have intersected within a collision proximity distance 402, which may be smaller than the warning zone 40 which is also displayed on the display 22. As shown in FIG. 2, the trajectory of the user's marine vessel and the trajectory of the second marine vessel will bring the two vessels within the warning zone 40. Therefore, a trajectory alert 42 has been activated, such as a display, or a sound emitted by the speaker 30. As shown in FIG. 4, the first marine vessel 601 and the second marine vessel 80 have entered into a warning zone 40 and a collision detection 404 has been activated. This collision detection may automatically send out an emergency response call to authorities and may broadcast the GPS location of the smartphone in the event that a collision has been detected. Also, the smartphone may utilize GPS to detect rapid deceleration to confirm that a collision has occurred. If the smartphone detects deceleration above a threshold value and a collision has been detected, then an emergency communication may be sent to the authorities automatically regarding the collision and GPS location. In an exemplary embodiment, the smartphone request confirmation that a collision has not occurred, such as by requiring an input from the smartphone user, to abort any communication to the authorities.

The authorities may be alerted of a detected collision and the authorities may have a display that shows the position and location of the marine vessels. The authorities may monitor the locations of the vessels to see if they continue on a trajectory, thereby negating a collision, or they may place a call or otherwise try to contact one or more of the smartphone owners to confirm a collision.

As shown in FIG. 5, a first marine vessel 601 has a trajectory 602 that intersects with a pier. If the speed of the first marine vessel is above a threshold speed at the time of intersecting with the pier, a collision alert may be activated, on the user's smartphone 20, and/or at an authority's location on an electronic device of an authority.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A smartphone marine vessel location and collision avoidance system comprising:
   a) a first marine vessel;
   b) a second marine vessel;
   c) a database for storing a first marine vessel location and a second marine vessel location;
   d) a first smartphone located on said first marine vessel of a first user comprising:
      i) a global positioning system;
      ii) a signal transceiver for sending and receiving signals to the database of the marine vessel location and collision avoidance system;
      iii) an Application software (App) that interfaces with the global positioning system of the first smartphone to transmits said first marine vessel location to the database via the signal transceiver;
   e) a second smartphone located on the second marine vessel of a second user comprising:
      iv) a global positioning system;
      v) a signal transceiver for sending and receiving signals to the database of the marine vessel location and collision avoidance system;
      vi) an Application software (App) that interfaces with the global positioning system of the second smartphone to transmits said second marine vessel location to the database;
   wherein the first smartphone receives the second marine vessel location information from the database and wherein the first smartphone activates an alert when the second marine vessel is within a warning zone distance from said first marine vessel; and
   wherein the trajectory of the first marine vessel is determined through changes in the first marine vessel location Provided by the global positioning system of the first marine vessel and wherein the trajectory of the second marine vessel is determined through changes in the second marine vessel location provided by the global positioning system of the second marine vessel, and wherein a collision warning is initiated on the first smartphone when the trajectory of the first marine vessel intercepts within a collision proximity distance from the trajectory of the second marine vessel.

2. The smartphone marine vessel location and collision avoidance system of claim 1, wherein the trajectory of the first marine vessel is determined through the global positioning system and wherein a trajectory alert is initiated when the trajectory of the first marine vessel will bring the first marine vessel within a waring zone distance from the second marine vessel.

3. The smartphone marine vessel location and collision avoidance system of claim 1, wherein the trajectory of the second marine vessel is determined through the global positioning system and wherein a trajectory alert is initiated when the trajectory of the second marine vessel will bring the second marine vessel within a waring zone distance from the first marine vessel.

4. The smartphone marine vessel location and collision avoidance system of claim 1, wherein a marine authority interfaces with said database to display the first marine vessel location and the second marine vessel location on a marine authority display.

5. The smartphone marine vessel location and collision avoidance system of claim 1, wherein the first smartphone comprises a location display of the first marine vessel and the second marine vessel.

6. The smartphone marine vessel location and collision avoidance system of claim 5, wherein a warning zone is displayed on the location display.

7. The smartphone marine vessel location system of claim 5, wherein the alert is produced on the display.

8. The smartphone marine vessel location and collision avoidance system of claim 1, wherein the smartphone has a speaker and wherein the alert is produced by said speaker on the smartphone.

9. The smartphone marine vessel location and collision avoidance system of claim 1, wherein the smartphone communicates with a second navigational system located on the first marine vessel; and
   wherein the second navigational system is a chartplotter and wherein the first smartphone communicates with said chartplotter on the first marine vessel to display the first marine vessel location and the second marine vessel location on said chartplotter.

10. The smartphone marine vessel location and collision avoidance system of claim 1, wherein the smartphone communicates with a second navigational system located on the first marine vessel; and
    wherein the second navigational system is an autopilot on the first marine vessel.

11. The smartphone marine vessel location and collision avoidance system of claim 1, wherein a collision detection is initiated when the trajectory of the first marine vessel intercepts within a collision proximity distance from the second marine vessel; and
    wherein the collision detection requires that a deceleration of the first marine vessel is above a threshold deceleration of 50 G force as determined by the first smartphone when the first marine vessel and the second marine vessel are within the collision proximity distance.

12. The smartphone marine vessel location and collision avoidance system of claim 11, wherein the collision detection is transmitted to a marine authority.

13. The smartphone marine vessel location and collision avoidance system of claim 11, wherein the collision detection requires that a speed of the first marine vessel or the second marine vessel be above a threshold speed when the first marine vessel and the second marine vessel are within the collision proximity distance.

14. The smartphone marine vessel location and collision avoidance system of claim 11, wherein a collision confirmation is automatically sent to the first marine vessel upon said collision detection.

15. The smartphone marine vessel location and collision avoidance system of claim 1, wherein a collision detection is initiated when the trajectory of the first marine vessel intercepts with a fixed object.

16. The smartphone marine vessel location and collision avoidance system of claim 15, wherein the collision detection requires that a speed of the first marine vessel is above a threshold speed when the first marine vessel intercepts with said fixed object.

17. The smartphone marine vessel location and collision avoidance system of claim 16, wherein the collision detection requires that a deceleration of the first marine vessel is above a threshold deceleration when the first marine vessel intercepts with said fixed object.

18. The smartphone marine vessel location and collision avoidance system of claim 17, wherein a collision confirmation is automatically sent to the first marine vessel upon said collision detection.

19. The smartphone marine vessel location and collision avoidance system of claim 18, wherein the collision detection is transmitted to a marine authority.

* * * * *